(12) United States Patent  (10) Patent No.: US 6,464,556 B1
Kohn  (45) Date of Patent: Oct. 15, 2002

(54) PEDAGOGICAL CHILDREN'S DOLL

(76) Inventor: Michael A. Kohn, 171 East 89th St., New York, NY (US) 10128

( * ) Notice: Subject to any disclaimer, the term of this patent is extended or adjusted under 35 U.S.C. 154(b) by 0 days.

(21) Appl. No.: 09/734,065

(22) Filed: Dec. 11, 2000

(51) Int. Cl.7 ................................................. A63H 3/46
(52) U.S. Cl. ......................... 446/376; 434/159; 446/369
(58) Field of Search ................................ 434/159, 160, 434/322; 446/369, 301, 300, 341, 390, 376; D21/576, 590, 604, 627; D19/59

(56) References Cited

U.S. PATENT DOCUMENTS

| | | | | |
|---|---|---|---|---|
| 3,365,198 A | * | 1/1968 | Hay | |
| 3,593,433 A | * | 7/1971 | Dillon | 35/35 R |
| 4,637,798 A | | 1/1987 | Maiden-nesset | |
| 4,889,512 A | | 12/1989 | Burnett et al. | |
| 5,417,604 A | * | 5/1995 | Rafelman | 446/124 |
| 5,516,322 A | | 5/1996 | Myers | |
| D373,158 S | * | 8/1996 | Dixon | D21/159 |
| D382,923 S | * | 8/1997 | Rehbein | D21/155 |
| 5,700,178 A | * | 12/1997 | Cimerman | 446/301 |
| 5,897,421 A | * | 4/1999 | Rink | 446/369 |

* cited by examiner

*Primary Examiner*—Derris H. Banks
*Assistant Examiner*—Jamila Williams
(74) *Attorney, Agent, or Firm*—Dilworth & Barrese, LLP

(57) ABSTRACT

A pedagogical doll having a body portion in the form of a letter of the alphabet and including a front portion and a back portion, a pair of legs depending flexibly from the body portion, each leg of the pair of legs including a foot portion extending from the leg, a sole surface formed on the bottom of the foot, and a letter of the alphabet formed on the sole surface; wherein each of the legs is movable from at least a forward facing position such that the sole surface is substantially parallel to a front surface of the body portion, to a rearward facing position.

9 Claims, 3 Drawing Sheets

PEDAGOGICAL CHILDREN'S DOLL

BACKGROUND

1. Technical Field

The present disclosure relates to children's educational play items. More particularly, the present disclosure relates to dolls which incorporate pedagogical indicia thereon.

2. Background of Related Art

Educational dolls or toys are known wherein instructional features are incorporated thereon. For example, dolls which teach counting, motor skill and coordination, exist which aid in teaching children. Therefore, children can interact with the doll either by themselves or with the assistance of a parent or an instructor to learn and reinforce basic skills.

A continuing need exists for improved playthings which are useful as teaching aids to assist in the educational process.

SUMMARY

The present disclosure provides a children's doll which is useful as a child's plaything and which can also be used to teach the child to learn basic information, for example, the letters of the alphabet, words, and numbers, in a manner that is both fun and stimulating for the child. A plurality of dolls are provided, each of which is shaped in the form of a letter of the alphabet. Alternatively, the doll may be shaped in the form of another instructional indicia such as a number.

A pair of legs depend from the bottom of the doll and have feet which are provided with both the upper and lower case format of the letter of which form the doll is fashioned. Preferably, the letters on the feet are provided one each on the respective soles of the feet. Alternatively, other instructional indicia may be provided on the soles of the feet. For example, indicia such as pictures of items the names of which are spelled beginning with the letter in which the doll's body portion is formed. Optionally, numbers may also be used on the soles of the feet in the embodiment where the doll's body portion is in the form of a number.

In one aspect of the presently disclosed doll, the doll is attractive and brightly colored so as to promote the child's interest in learning. Alternatively, the doll may be further animated by the inclusion of facial features.

In another aspect of the present invention a method of instructing an individual in letter recognition is provided which includes the steps of providing doll which includes a body portion in the form of a letter of the alphabet and including a front portion and a back portion and arranging at least one of a pair of legs such that a letter of the alphabet formed on a sole surface on the bottom of the foot is oriented toward the front of the doll so as to be visible to an individual looking at the front of the doll.

In another aspect of the present invention, a further method is provided which is a method of instructing an individual in word recognition. That method includes the steps of providing a plurality of dolls each of which includes a body portion in the form of a letter of the alphabet and including a front portion and a back portion, arranging at least one of a pair of legs such that a letter of the alphabet formed on a sole surface on the bottom of the foot is oriented toward the front of the doll so as to be visible to an individual looking at the front of the doll, and arranging the plurality of dolls in a series in a predetermined sequence so as to form a word.

BRIEF DESCRIPTION OF THE DRAWINGS

FIG. 3 is a perspective view of a series of dolls arranged so as to form a word.

DETAILED DESCRIPTION OF PREFERRED EMBODIMENTS

Figure 1:
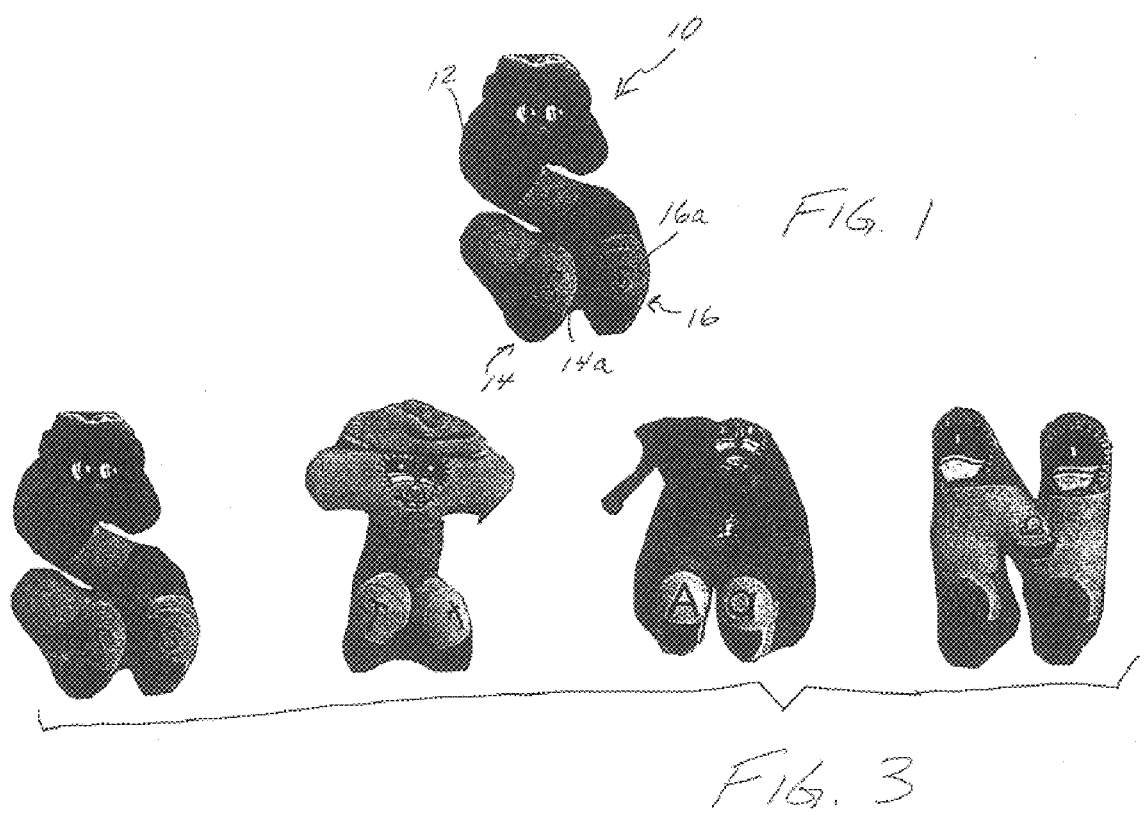
FIG. 1 is a perspective view of one illustrative embodiment of a pedagogical doll constructed in accordance with the present disclosure.

Referring now to the drawing figures wherein like reference numerals identify similar or identical elements, and initially to FIG. 1, a doll 10 is shown having a body portion 12, a right leg 14, a left leg 16. Preferably the doll is a three dimensional figure which may formed of a outer plush material cut in a pattern and sewn together to form the shape of the particular doll. Doll 10 is stuffed with a soft material such as, for example, fiberfill or any other suitable plush material. Body portion 12 is formed in the shape of one element in a series of an instructional concept. In the exemplary embodiment shown in FIG. 1, body portion 12 is in the form of a letter of the alphabet, specifically, the letter "S".

Although the illustrated embodiment, the instructional features are manifested as letters, it is within the scope of the present invention that other instructional concepts may also be utilized as the form of the dolls. For example, the dolls may be in the form of numbers.

Legs 14 and 16 each terminate with a foot and depend from the bottom of body portion 12 in such a manner as to permit movement of legs 14 and 16 relative to body portion 12. Sole portions 14a and 16a of legs 14 and 16, are provided with at least one instructional item formed thereon. For example, sole portions 14a and 16a are provided with an uppercase letter and a lowercase letter, respectively, which match the letter which is formed by body portion 12. In the illustrative example of FIG. 1, sole portion 14a is provided with an uppercase "S" formed thereon and sole portion 16a is formed with a lowercase "s" formed thereon. In this manner, when viewed from the front with legs 14 and 16 folded toward the front of doll 10, the uppercase and lowercase letters formed on sole portions 14a and 16a, respectively, are visible in that order. Thus, a child can readily and repeatedly be exposed to the proper uppercase and lowercase form of a letter either through playing with doll 10 on their own or with the instructional assistance of a parent or other instructor.

Alternatively, dolls 10 may include other instructional indicia on either the body portion, or the sole portions 14a and 16a or both. Preferably, the various instructional indicia formed on a particular doll 10 are related. For example, doll 10 may be shaped in the form of a number and may include the number on the sole portions 14a and 16a. Alternatively, the doll may also be provided with indicia formed thereon which are multiple illustrations of the same item which correspond in number to the number in which the doll is shaped as.

Figure 4A:
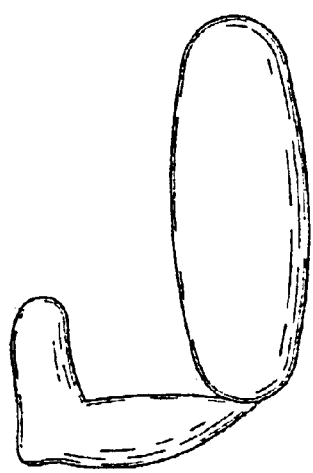
FIGS. 4A and 4B illustrate the legs of the doll of the present invention oriented towards the front of the doll and the rear of the doll, respectively.
Figure 4B:
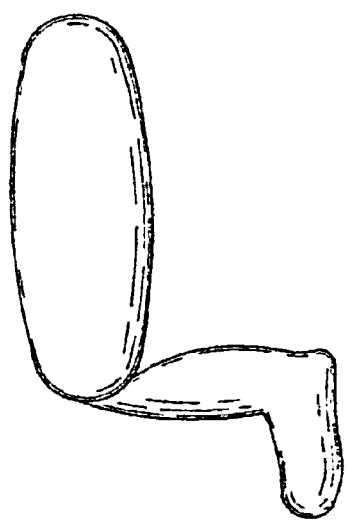

In one contemplated method of use, each letter doll may be used as in a "flash card" style format. For example, the child may be shown the doll from the front with legs 14 and 16 folded to the back such that sole portions 14a and 16a are not visible to the child, as in FIG. 4B. Then, either one or both of legs 14, 16 may be manipulated toward the front of doll 10 such that sole portions 14a, 16a come into view for the child to see, as in FIG. 4A.

To additionally stimulate a child's interest and learning experience, dolls 10 may be provided with animal or human features, for example facial features such as eyes, nose and a mouth. Further, articles of clothing may be attached to dolls 10. Additionally, dolls 10 may be provided with stripes, polka dots or other aesthetic features to visually stimulate the child. Such features may either be in color or black and white.

Figure 2:
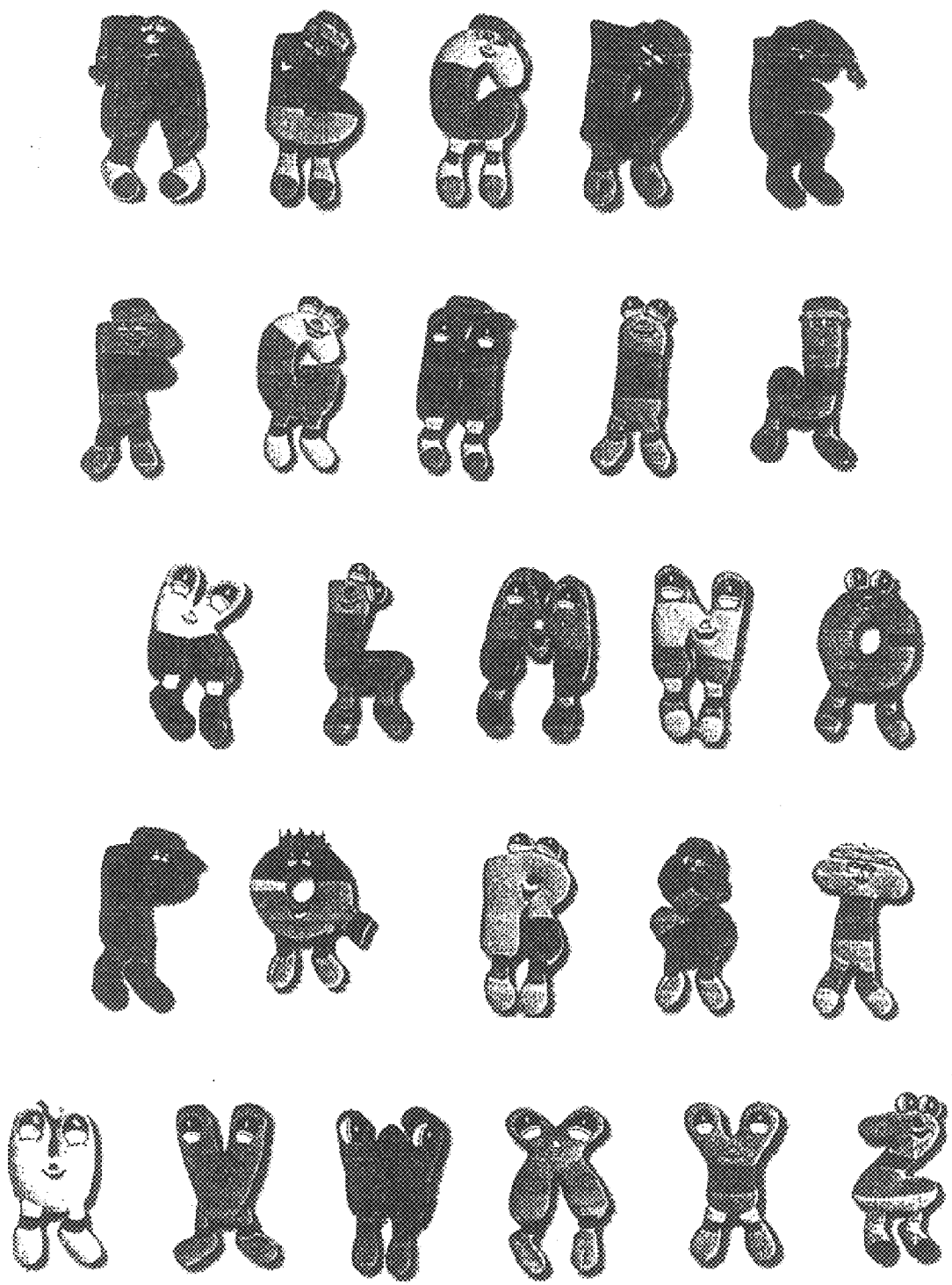
FIG. 2 is a perspective view of a series of twenty-six dolls of different alphabetic characters.

Referring to FIG. 2, dolls 10 illustrates one embodiment of a series of dolls 10 formed to represent a complete series of an instructional group. For example, as shown in FIG. 2, dolls 1–10 may be formed in all twenty-six letter of the alphabet. Preferably each letter is formed so as to have a different or distinctive look compared with any of the other letters. In each instance, dolls 10 have the uppercase and lowercase letters, corresponding to the letter defined by the body portion of the doll, formed on the sole portions of the doll's feet. Alternatively, dolls 10 may form a series of another instructional group of items, for example, the numbers 0 through 9.

As shown in FIG. 3, a plurality of dolls 10 may be arranged in series either by a child or by a parent or other instructional assistant in order to form words. In this manner, in addition to learning the various uppercase and lowercase pairs for a given letter, a child may also be instructed or practice recognition and formation of words. In the embodiment wherein dolls 10 are formed in the shape of numbers, the dolls may be arranged in series to instruct a child in the recognition of various numbers represented by the series.

In one method of instructing, dolls 10 may be arranged in a series to form a word, such as "Stan" in the illustrated example of FIG. 3, with all legs facing forward.

Alternatively, when a word is formed by arranging dolls 10 in a series, one of legs 14 or 16 may be folded to the rearward orientation such that only one leg remains facing forward. In this manner, either the uppercase or the lowercase form of the letter remains facing forward such that the proper spelling of a word may be demonstrated to or practiced by a child learning to spell. In the example, of the proper name "Stan" shown in FIG. 3, the leg with lowercase "s" could be moved to face toward the rear of the doll leaving only the uppercase "S" visible from the front. The legs bearing the uppercase letters "T", "A", and "N" of the remaining dolls could be moved to face toward the rear of the respective dolls leaving only the lowercase forms of the respective letters visible from the front of the dolls.

It will be understood that various modifications may be made to the embodiments of the presently disclosed pedagogical children's doll and methods of instructional use thereof disclosed herein. Therefore, the above description should not be construed as limiting, but merely as exemplifications of preferred embodiments. Those skilled in the art will envision other modifications within the scope and spirit of the present disclosure.

What is claimed is:

1. A pedagogical doll which comprises:
    a body portion in the form of an instructional concept and including a front portion and a back portion; and
    a pair of legs depending flexibly from the body portion, each leg of the pair of legs including:
        a foot portion extending from the leg;
        a sole surface formed on the bottom of the foot; and
        an instructional indicia being formed on the sole surface, the instructional indicia corresponding to the instructional concept of the body portion;
    wherein each of the legs is movable from at least a forward facing position such that the sole surface is substantially parallel to a front surface of the body portion, to a rearward facing position.

2. A pedagogical doll according to claim 1, wherein the instructional concept and the instructional indicia is a letter of the alphabet.

3. A pedagogical doll according to claim 2 wherein the letter of the alphabet formed on the sole surface of one of the pair of legs is in the form of an uppercase letter.

4. A pedagogical doll according to claim 2 wherein the letter of the alphabet formed on the sole surface of one of the pair of legs is in the form of a lowercase letter.

5. A pedagogical doll according to claim 1, wherein the instructional concept and the instructional indicia is a number.

6. A method of instructing an individual in letter recognition comprising the steps of:
    providing a doll which includes a body portion in the form of an instructional concept and including a front portion and a back portion; and
    arranging at least one of a pair of legs such that an instructional indicia of the leg which represents the instructional concept of the body portion is formed on a sole surface on the bottom of a foot of the leg, the sole surface being oriented toward the front portion of the doll so as to be visible to an individual looking at the front portion of the doll, wherein each of the legs is movable from at least a forward facing position such that the sole surface is substantially parallel to the front portion of the body portion, to a rearward facing position.

7. A method according to claim 6, wherein the instructional concept and the instructional indicia is a letter of the alphabet.

8. A method according to claim 6, wherein the instructional concept and the instructional indicia is a number.

9. A method of instructing an individual in recognition a series of elements in an instructional concept comprising the steps of:
    providing a plurality of dolls each of which includes a body portion in the form of one member of a series of elements in an instructional concept and each of which includes a front portion and a back portion;
    arranging at least one of a pair of legs such that an instructional indicia provided on a sole surface on the bottom of a foot of the leg is oriented toward the front portion of the doll so as to be visible to an individual looking at the front portion of the doll, the instructional indicia of the leg representing the instructional concept of the body portion, wherein each of the legs is movable from at least a forward facing position such that the sole surface is substantially parallel to the front portion of the body portion, to a rearward facing position; and
    arranging the plurality of dolls in a series in a predetermined sequence.

* * * * *